United States Patent
Chen et al.

(10) Patent No.: US 10,121,222 B2
(45) Date of Patent: Nov. 6, 2018

(54) BANDWIDTH EFFICIENT METHOD FOR GENERATING AN ALPHA HINT BUFFER

(71) Applicant: MediaTek Inc., Hsinchu (TW)

(72) Inventors: Ying-Chieh Chen, Kaohsiung (TW); I-Hsuan Lu, Hsinchu (TW); Shih-Chin Lin, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 126 days.

(21) Appl. No.: 15/242,478

(22) Filed: Aug. 19, 2016

(65) Prior Publication Data

US 2017/0213315 A1  Jul. 27, 2017

Related U.S. Application Data

(60) Provisional application No. 62/281,814, filed on Jan. 22, 2016.

(51) Int. Cl.
*G06T 1/60* (2006.01)
*G06T 11/60* (2006.01)

(52) U.S. Cl.
CPC .............. *G06T 1/60* (2013.01); *G06T 11/60* (2013.01)

(58) Field of Classification Search
CPC .................. G06T 1/60; G06T 11/60
See application file for complete search history.

(56) References Cited

U.S. PATENT DOCUMENTS

| | | | |
|---|---|---|---|
| 2009/0051687 A1* | 2/2009 | Kato | G06T 15/80 345/426 |
| 2011/0157205 A1* | 6/2011 | Tao | G06T 15/04 345/582 |
| 2015/0178974 A1* | 6/2015 | Goel | G06T 1/20 345/420 |
| 2016/0247249 A1* | 8/2016 | Harris | G06T 9/00 |

OTHER PUBLICATIONS

Zhang et al., "Visibility Culling using Hierarchical Occlusion Maps", Proceeding SIGGRAPH '97 Proceedings of the 24th annual conference on Computer graphics and interactive techniques, pp. 77-88, ACM Press/Addison-Wesley Publishing Co. New York, NY, USA © 1997.*

* cited by examiner

*Primary Examiner* — Tapas Mazumder
(74) *Attorney, Agent, or Firm* — Tong J. Lee (57) ABSTRACT

A graphics processing unit (GPU) renders graphical objects into a group of pixels and stores the pixels in an on-chip buffer on the same chip as the GPU. Each pixel has an alpha value that indicates transparency of the pixel. The GPU reads the alpha value of each pixel from the on-chip buffer. According to alpha values of the group of pixels, the GPU generates an alpha hint in the system memory for the group of pixels. The alpha hint represents an aggregate of the alpha values of the group of pixels. The GPU then stores the group of pixels into a frame buffer in the system memory.

18 Claims, 6 Drawing Sheets

```
#extension GL_EXT_Shader_framebuffer_fetch: require
buffer xx{
    int hint[tileNum];
}buf;
void main()
{
    int offset = calculateTileOffset(gl_FragCoord);
    float alpha = gl_LastFragData[0].a;
    if( alpha == 0.0)
        buf.hint[offset][0] = 0x1;
    else if( alpha == 1.0 )
        buf.hint[offset][1] = 0x1;
    else
        buf.hint[offset][2] = 0x1;
}
```

FIG. 5A

```
#extension GL_EXT_Shader_framebuffer_fetch: require
buffer xx{
    int hint[tileNum];
}buf;
void main()
{
    int offset = calculateTileOffset(gl_FragCoord);
    float alpha = gl_LastFragData[0].a;
    if( alpha == 0.0)
        atomicOr( buf.hint[offset], 0x001);
    else if( alpha == 1.0 )
        atomicOr( buf.hint[offset], 0x010);
    else
        atomicOr( buf.hint[offset], 0x100);}
```

BANDWIDTH EFFICIENT METHOD FOR GENERATING AN ALPHA HINT BUFFER

CROSS-REFERENCE TO RELATED APPLICATIONS

This application claims the benefit of U.S. Provisional Application No. 62/281,814 filed on Jan. 22, 2016.

TECHNICAL FIELD

Embodiments of the invention relate to a graphics processing system; and more specifically, to a method for generating graphics images with efficient memory access.

BACKGROUND

In computer graphics, rendering is the process of producing images on a display device from descriptions of graphical objects or models. A graphics processing unit (GPU) renders 2D and 3D graphical objects, which are often represented by a combination of primitives such as points, lines, polygons, and higher order surfaces, into picture elements (pixels). A GPU typically includes a rendering pipeline for performing rendering operations. A rendering pipeline includes the following main stages: (1) vertex processing, which processes and transforms the vertices that describe the primitives, into a projection space, (2) rasterization, which converts each primitive into a set of pixels aligned with the pixel grid of the display, (3) fragment processing, which processes each individual pixel to generate its color and depth values, among other things, and (4) output processing, which combines all of the pixels into a surface (i.e., an image layer) in the 2D display space.

A displayed image (i.e., a frame) is typically composed of multiple surfaces, and each surface is composed of pixels. Each pixel is described by a number of values and attributes including but not limited to: a pixel position, a depth value, and a color value such as a four-tuple vector (R, G, B, A) indicating the values of red, green, blue, and an alpha value specifying a degree of transparency of the pixel. The alpha value is typically normalized to the range of [0, 1], with 0 denotes fully transparent and 1 denotes fully opaque. A fully-transparent surface consists of fully-transparent pixels only, and a fully-opaque surface consists of fully-opaque pixels only. A fully-transparent surface has no contribution to the displayed frame; that is, the color values of the surface are completely nullified by the zero alpha values of its pixels. On the other hand, a fully-opaque surface completely blocks any overlapping portions of the surfaces (if any) behind it.

Some of the existing graphics systems read the color values of every surface when multiple surfaces are composited into a frame, even if the alpha values of these surfaces indicate that some of the color values are not needed. Reading the color values involves memory access and causes delays. As the display generally operates at a fixed refreshing frequency (e.g., 60 Hz), the delays may cause dropped frames and poor system performance.

To reduce memory access, a compositor may determine whether or not to retrieve a surface, or a portion thereof, based on the contents of a hint buffer. If the buffer indicates that the surface is fully transparent, then the compositor does not even fetch the surface. If the buffer indicates that the surface is fully opaque, then the compositor does not fetch those surfaces or the overlapping portions of those surfaces (if any) that are behind the fully-opaque surface.

However, the generation of the hint buffer content adds significant overhead to the system performance. Therefore, there is a need to improve the generation of the hint buffer content.

SUMMARY

In one embodiment, a method is provided for generating an alpha hint in a system memory to reduce memory access. A GPU renders graphical objects into a group of pixels stored in an on-chip buffer on the same chip as the GPU. Each pixel has an alpha value that indicates transparency of the pixel. The GPU reads an alpha value of each pixel from the on-chip buffer. According to alpha values of the group of pixels, the GPU generates the alpha hint in the system memory for the group of pixels. The alpha hint represents an aggregate of the alpha values of the group of pixels. The GPU then stores the group of pixels into a frame buffer in the system memory.

In another embodiment, a graphics device is provided for generating an alpha hint in a system memory to reduce memory access. The graphics device comprises: an on-chip buffer, and rendering hardware to render graphical objects into a group of pixels and to store the group of pixels in the on-chip buffer. The rendering hardware is operative to read an alpha value of each pixel from the on-chip buffer, wherein the alpha value indicates transparency of the pixel. According to alpha values of the group of pixels, the rendering hardware is further operative to generate the alpha hint in the system memory for the group of pixels, the alpha hint representing an aggregate of alpha values of the group of pixels. The graphics device is further operative to store the group of pixels into a frame buffer in the system memory.

According to embodiments described herein, a graphics device generates alpha hints with high efficiency and minimal system memory access. The alpha hint of a tile and the tile itself are generated in the same rendering pass. There is no need to copy or to scan a frame buffer in order to generate the alpha hint. Thus, the memory traffic can be reduced and the performance of the graphics device can be significantly improved.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system, device and method for efficiently generating alpha hints of a surface to indicate whether the surface is fully transparent, fully opaque, or neither fully transparent nor fully opaque. The alpha hints of a surface are placed in an alpha hint buffer, also referred to as a hint buffer. Each alpha hint represents an aggregate of alpha values of a group of pixels. In one embodiment, each alpha hint is a binary value that indicates whether a corresponding group of pixels in a surface are fully transparent, fully opaque, or neither fully transparent nor fully opaque. For example, the corresponding group of pixels may be the pixels that form a tile of a display area, such as a 32×32 pixel block or another pixel block size. During surface composition, a compositor reads the hint buffer of a given surface before retrieving the color values of the surface. In one embodiment, each alpha hint in the hint buffer corresponds to a tile of the given surface. If the alpha hint indicates that the corresponding tile is fully transparent, the compositor may not retrieve that tile from the memory. If the alpha hint indicates that the corresponding tile is fully opaque, the compositor may not retrieve the tiles (if any) that are directly behind the corresponding tile from the memory.

The term "memory," as used herein, refers to a system memory device that is typically a random-access memory (RAM) on a separate chip from the GPU. For example, the system memory may be a dynamic random-access memory (DRAM), or other volatile or non-volatile random-access memory). The terms "on-chip" or "on the same chip," as used herein, refers to integrated circuitry fabricated on the same semiconductor wafer. Furthermore, the term "directly behind" as in "A is directly behind B" refers to a scenario in which A is behind B and is completed blocked by B.

In one embodiment, a GPU generates alpha hints with minimized memory access and high efficiency. More specifically, after a tile is rendered into pixels and before the rendered tile is written to the frame buffer in the memory, the GPU reads the alpha values of each pixel in the tile from an on-chip tile buffer and writes the corresponding alpha hint to a hint buffer. Thus, the alpha hints generation involves no memory reads and therefore achieves significant savings in the memory bandwidth. By contrast, with an existing GPU two-pass approach, the alpha hints would be generated by a GPU after the GPU writes a rendered surface with its alpha values to the memory. Thus, the GPU would perform memory reads to be able to determine the alpha hints for the surface. With an existing CPU approach, the alpha hints would be generated by a CPU after the GPU writes a rendered surface with its alpha values to the memory. Thus, the CPU would have to copy the surface into its own memory space, and read from that memory space to able to determine the alpha hints for the surface. According to the alpha hints generation described herein, a GPU may generate the alpha hints concurrently with surface rendering and with minimized memory access; thus, system performance can be significantly improved.

Figure 1:
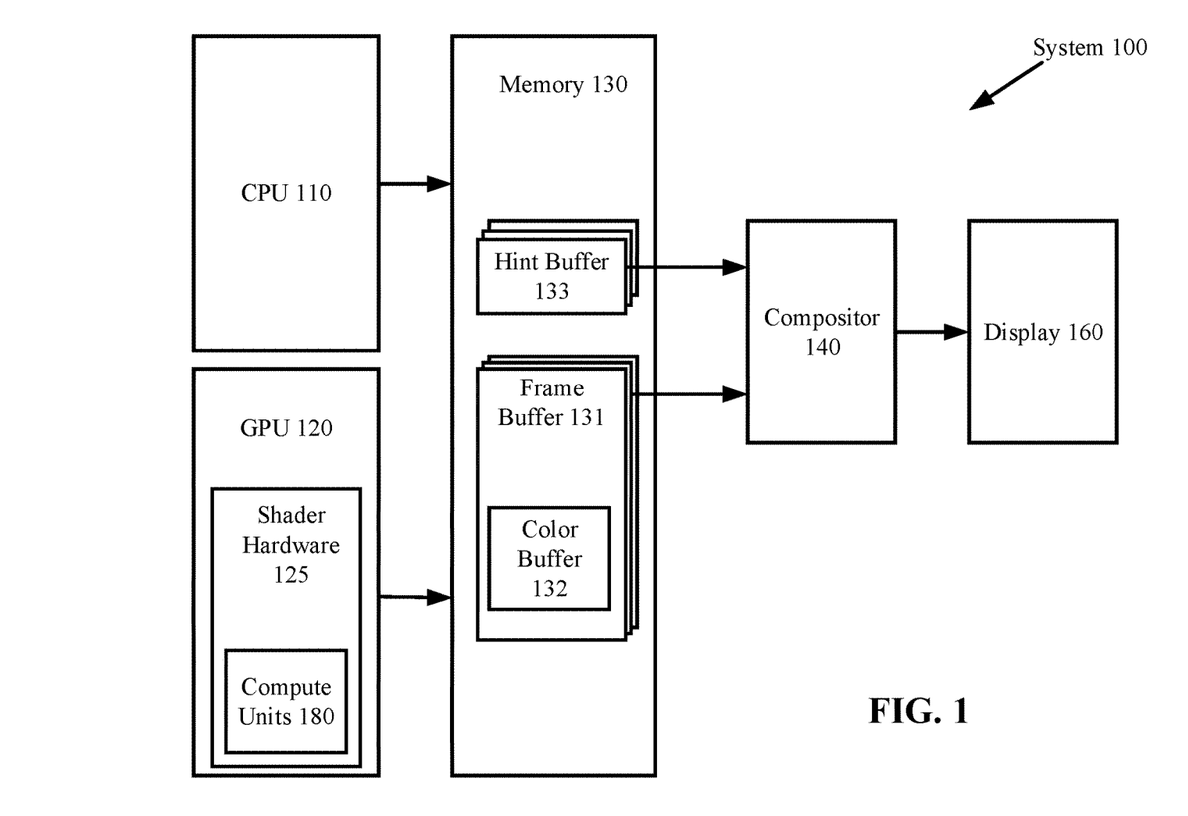
FIG. 1 illustrates a system that performs graphics rendering operations according to one embodiment.

FIG. 1 illustrates a system 100 according to one embodiment. The system 100 includes a CPU 110, a GPU 120, a system memory ("memory") 130, a compositor 140 and a display 160, among other components. It is understood that many other system components are omitted herein for simplicity of illustration. Although only one CPU and one GPU are shown, it is understood that the system 100 may include any number of CPUs and GPUs, as well as any number of other processors. In one embodiment, the CPU 110 and/or the GPU 120 may be implemented as a system-on-a-chip (SoC). Each CPU 110 may include multiple CPU cores and each GPU may include multiple GPU cores. The memory 130 may be a DRAM, or other volatile or non-volatile random-access memory. In one embodiment, the system 100 may be part of a mobile computing and/or communication device (e.g., a smartphone, a tablet, a laptop, etc.). In another embodiment, the system 100 may be part of server computer.

In one embodiment, the CPU 110 performs general-purpose computing tasks, and may issue graphics commands via one or more graphics Application Program Interfaces (APIs) for the GPU 120 to execute. The GPU 120 renders graphical objects, as directed by the graphics commands, into pixels that are aligned with the pixel grids of the display 160. The graphical objects may include 2D and 3D graphical objects, and may be represented by a combination of primitives such as points, lines, polygons, and higher order surfaces. In one embodiment, the GPU 120 (more specifically, each GPU core) includes shader hardware 125 as part of its rendering hardware pipeline for performing shader operations including at least fragment shader operations. The shader hardware 125 includes an array of compute units 180 (e.g., arithmetic logic units (ALUs)) to execute instructions pre-defined in an instruction set, and/or operations specified by commands. The array of compute units 180 may perform logical, integer and floating point operations, among other operations, and can be scheduled to perform the operations sequentially and/or in parallel. These shader instructions can be written in high-level languages such as OpenGL Shading Language (GLSL), High-Level Shading Language (HLSL) in Direct3D, or C for Graphics (Cg), etc.

In one embodiment, each of the CPU 110, the GPU 120 and other image producers such as a camera or a video recorder may generate one or more surfaces. The generated surfaces, such as a home screen, status bar, and system user interface (UI), etc., may be temporarily stored in the memory 130 before being composited by the compositor 140 for the display 160. More specifically, each surface may be stored in a frame buffer 131 with its color values stored in a color buffer 132. In one embodiment, the surfaces may have different sizes.

In one embodiment, each color buffer 132 has a corresponding hint buffer 133 for storing the alpha hints of the surface. As mentioned above, the compositor 140 may read the alpha hints of the surfaces before retrieving the surfaces from the memory 130 for composition. Based on the alpha hints, the compositor 140 determines which color buffers 132 to retrieve. If the hint buffer 133 indicates that a surface is fully transparent, then the compositor may skip retrieval of the fully-transparent surface. If the hint buffer 133 indicates that a surface is fully opaque, then the compositor 140 may skip retrieval of those surfaces (if any) that are directly behind the fully-opaque surface. The compositor 140 then applies the corresponding alpha values to the retrieved color values, and combines the resulting alpha-weighted color values to generate a composited frame for display. In an alternative embodiment, the compositor 140 may determine whether to retrieve a tile of a surface from the memory 130 based on the contents of the hint buffers 133; e.g., whether the tile is full transparent, or whether the tile is directly behind a fully-opaque tile.

As the size of the hint buffers 133 is much smaller than the size of the color buffers 132, reading the hint buffers 133 before accessing the color buffers 132 may significantly reduce the amount of memory access and improve system performance.

Figure 2:
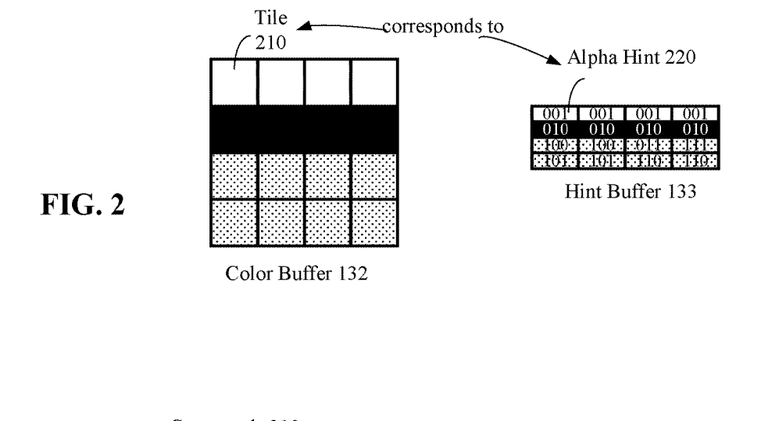
FIG. 2 illustrates a color buffer and its corresponding hint buffer according to one embodiment.

FIG. 2 illustrates a color buffer 132 and its corresponding hint buffer 133 according to one embodiment. As an example, the color buffer 132 is partitioned into a number of tiles 210; e.g., 4×4 tiles, and each tile 210 has a corresponding alpha hint 220 in the hint buffer 133. In one embodiment, each alpha hint 220 is a 3-bit flag; alternatively, each alpha hint includes three 1-bit flags. In alternative embodiments, the alpha hint may have a different number of bits from the example shown in FIG. 2.

In the example of FIG. 2, the first bit (e.g., the rightmost bit) of the alpha hint 220 is set (e.g., to one) when at least one pixel in the corresponding tile 210 is fully transparent; the second bit (e.g., the middle bit) is set (e.g., to one) when at least one pixel in the corresponding tile 210 is fully opaque, and the third bit (e.g., the leftmost bit) is set (e.g., to one) when at least one pixel in the corresponding tile 210 is neither fully transparent nor fully opaque. Thus, a tile 210 is fully-transparent when its corresponding alpha hint 220 has only the first bit set, and a tile 210 is fully-opaque when its corresponding alpha hint 220 has only the second bit set. It is understood that in different embodiments the bit positions of the alpha hints 220 may be defined differently from the example shown in FIG. 2.

For example, an alpha hint of "001," such as the alpha hints 220 corresponding to the tiles 210 in the top row, indicates that those tile 210 in the top row has only fully-transparent pixels since the other two bits of the alpha hints 220 are not set. An alpha hint of "010," such as the alpha hints 220 corresponding to the tiles 210 in the middle row, indicates that those tile 210 in the middle row has only fully-opaque pixels since the other two bits of the alpha hints 220 are not set. The alpha hints 220 corresponding to the bottom two rows of the tile 210 indicate that those tiles 210 are neither fully transparent nor fully opaque.

Figure 3:
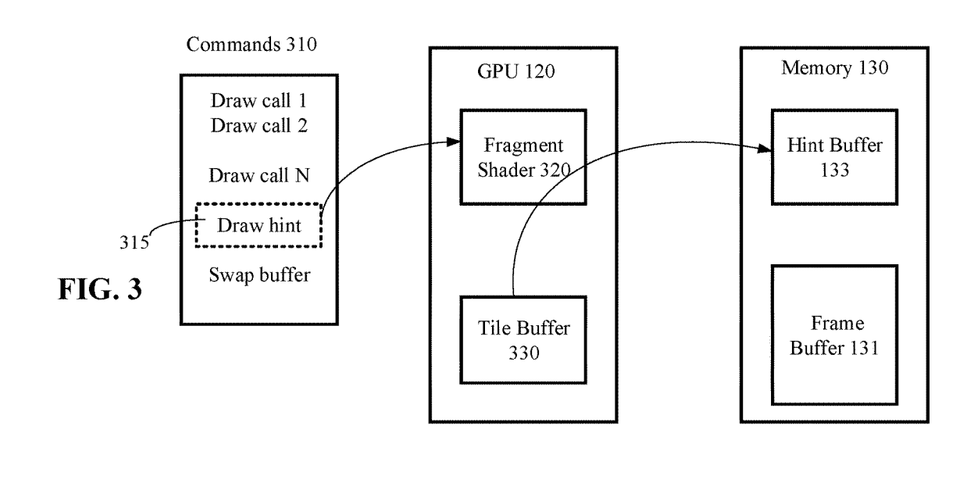
FIG. 3 illustrates a GPU executing a draw hint command according to one embodiment.
Figure 4:
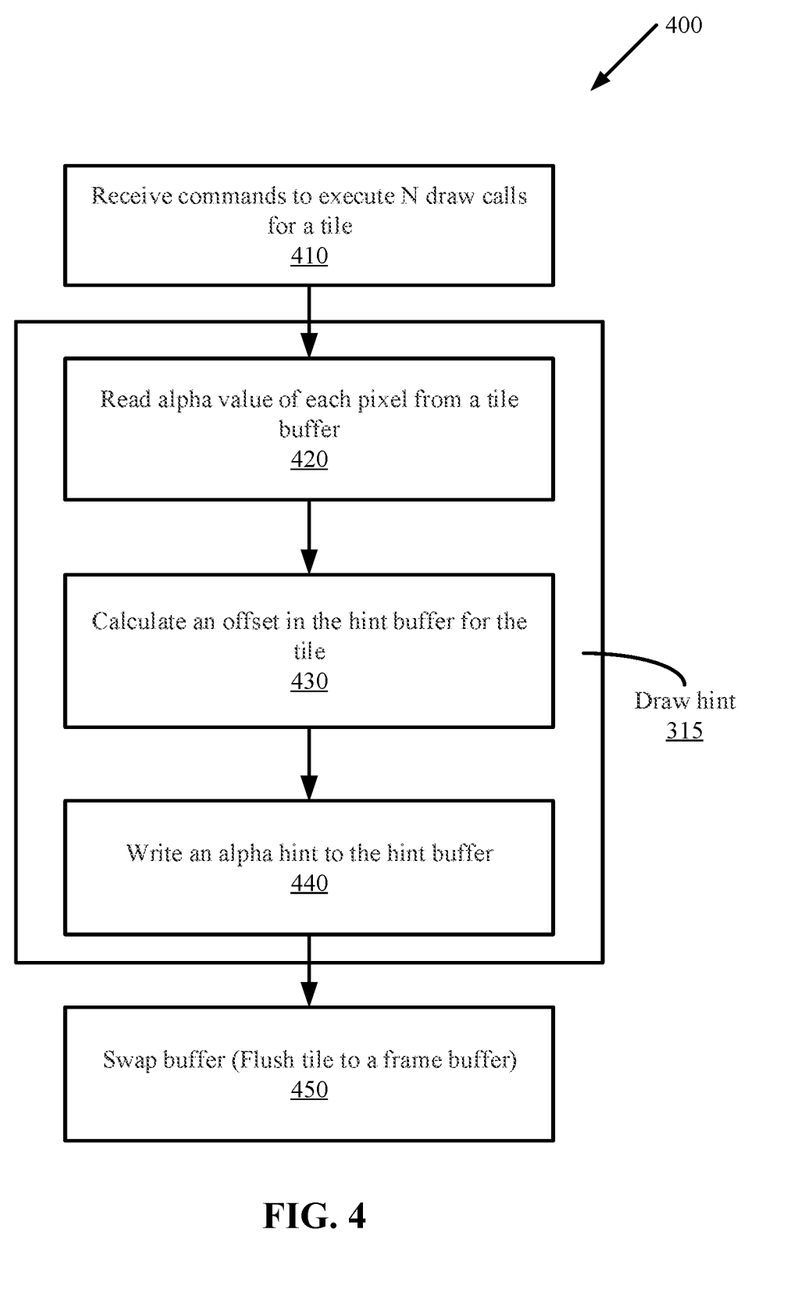
FIG. 4 illustrates a method of a GPU for executing the draw hint command according to one embodiment.

FIG. 3 illustrates the GPU 120 executing a draw hint command according to one embodiment, and FIG. 4 is a flow diagram illustrating a method 400 performed by the GPU 120 for executing a draw hint command according to one embodiment. Referring to FIG. 3 and FIG. 4, the GPU 120 receives a list of commands 310 to execute N draw calls for a tile (step 410), where N represents the number of graphical objects in the tile to be rendered. The result of the draw calls are values and attributes of the pixels that fall within the tile. The pixel values and their attributes, such as color values and alpha values, are written by a fragment shader 320 into an on-chip tile buffer 330. The fragment shader 320 may be part of the shader hardware 125 (FIG. 1).

In one embodiment, the shader hardware 125 may be programmed to execute the operations of the fragment shader 320.

In one embodiment, the tile buffer 330 is a random access memory (RAM) such as static RAM (SRAM) that is on the same chip as the GPU 120. After the pixel values and attributes are written into the tile buffer 330, the GPU 120 executes a "draw hint" command 315 in the list of commands 310. In response to the draw hint command 315, the GPU 120 (e.g., the fragment shader 320) reads the alpha value of each pixel from the tile buffer 330 (step 420), calculates an offset in the hint buffer 133 for the tile (step 430), and writes an alpha hint to the hint buffer 133 for the tile (step 440) at the calculated offset location. After the alpha hint is written to the hint buffer 133, the GPU 120 executes a "swap buffer" command to flush the content of the tile buffer 330 to the frame buffer 131 in the memory 130 (step 450); that is, to store the pixels (such as the pixel values and attributes) of the tile to the frame buffer 131. The GPU 120 may continue to render the next tile; e.g., by repeating the steps 410-450 of FIG. 4.

Accordingly, the alpha hints can be generated efficiently, because the GPU 120 reads the alpha values of a tile from the on-chip tile buffer 330 instead of the memory 130. Furthermore, the alpha hint of a first tile can be generated concurrently with rendering of a second tile. Thus, the efficiency of the alpha hint generation may be further enhanced.

In one embodiment, the GPU 120 may use multiple tile worker units to concurrently render multiple tiles, and store the rendered pixel values and attributes in respective tile buffers 133. In one embodiment, the GPU 120 may use the shader hardware 125 to concurrently read the alpha values of multiple pixels of a tile and generate an alpha hint for the tile. In one embodiment, the tile worker units and pixel worker units may be part of the fragment shader 320 and the computations of these worker units may be carried out by the compute units 180 (FIG. 1) in parallel.

Figure 5A:
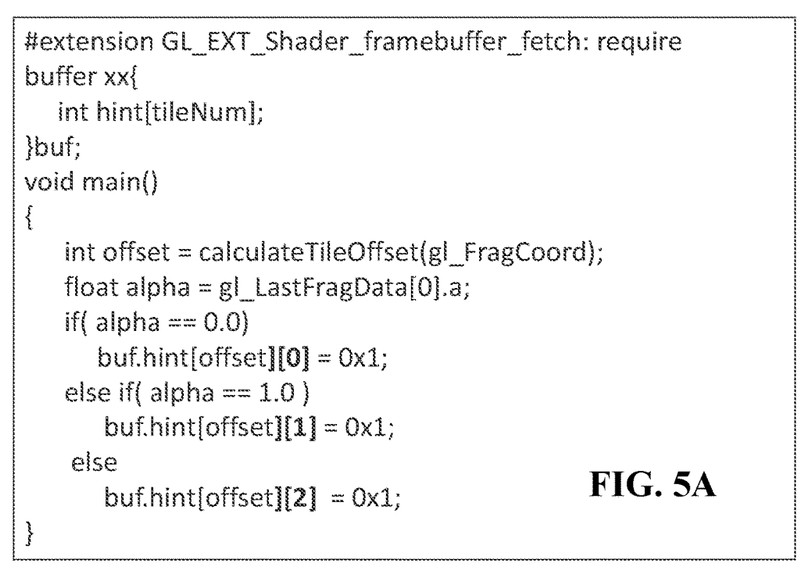
FIG. 5A illustrates a procedure for executing the draw hint command according to one embodiment.
Figure 5B:
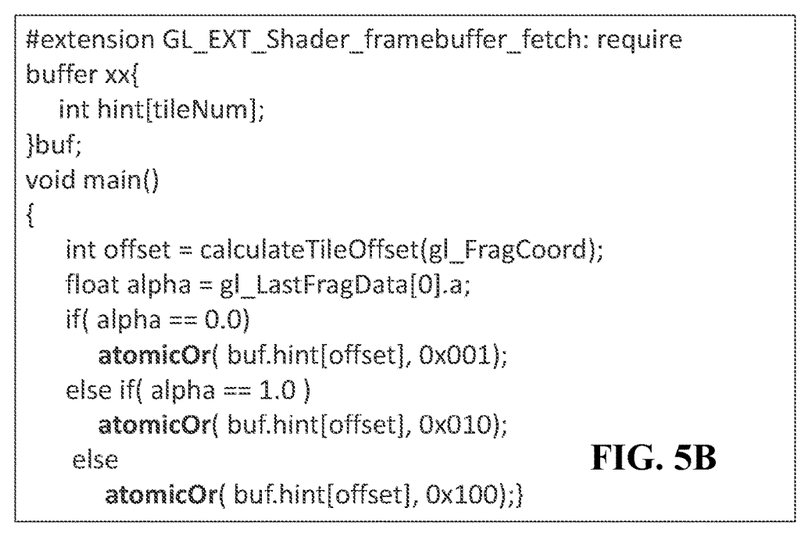
FIG. 5B illustrates a procedure for executing the draw hint command according to another embodiment.

In one embodiment, the GPU 120 executes a procedure in response to the draw hint command 315. FIG. 5A and FIG. 5B illustrates two alternative shader codes for the procedure. In both FIG. 5A and FIG. 5B, an array buf.hint represents the hint buffer 133. In one embodiment, the array buf.hint may be cached or temporarily stored in a location on the same chip as the GPU 120 before being written into the hint buffer 133. The buf.hint[offset] represents the offset location in the hint buffer 133 where the alpha hint for a tile is to be written. In one embodiment, the fragment shader 320 may use multiple pixel worker units to concurrently read the alpha values of multiple pixels in a tile, and write to the same alpha hint corresponding to the tile. Thus, these pixel worker units may attempt to write to buf hint[offset] at the same offset location at the same time. To avoid the write-after-write (WAW) hazard, special care is taken such that each write to buf.hint[offset] can only set a bit to one, but not reset the bit to zero.

In the example of FIG. 5A, the fragment shader 320 calculates an offset in the hint buffer 133 for a tile, and, according to the alpha value of a pixel in the tile, the fragment shader 320 sets the appropriate bit of buf.hint [offset] to one. In this example, each alpha hint contains three 1-bit flags. The first flag is set to one when the pixel is fully transparent, the second flag is set to one when the pixel is full opaque, and the third flag is set to one when the pixel is neither fully transparent nor fully opaque. Once a flag is set to one, it cannot be reset to zero by another pixel in the same tile. In this example, each flag of the alpha hint can be set independently of the other two flags; thus, one pixel worker unit may be writing to a flag of the alpha hint while another pixel worker unit is concurrently writing to another flag of the same alpha hint. Furthermore, the writes to the alpha hint can be asynchronous to improve system performance.

In the example of FIG. 5B, the fragment shader 320 calculates an offset in the hint buffer 133 for a tile, and, according to the alpha value of a pixel in the tile, the fragment shader 320 performs an atomic OR operation at the offset position. The atomic operation serializes the concurrent writes of the pixel worker units that may attempt to write to the same alpha hint for the same tile at the same time. In this example, each alpha hint contains a 3-bit flag. The atomic operation calculates a bit-wise OR of the 3-bit flag with a 3-bit mask, with the value of the mask determined by the alpha value of the pixel. Only a single bit of the 3-bit mask is one. For example, the first bit of the mask is one when the alpha value is zero, the second bit of the mask is one when the alpha value is one, and the third bit of the mask is one when the alpha value is neither one nor zero. The OR operation ensures that once a flag bit is set by one pixel, it cannot be reset by another pixel in the same tile.

Figure 6:
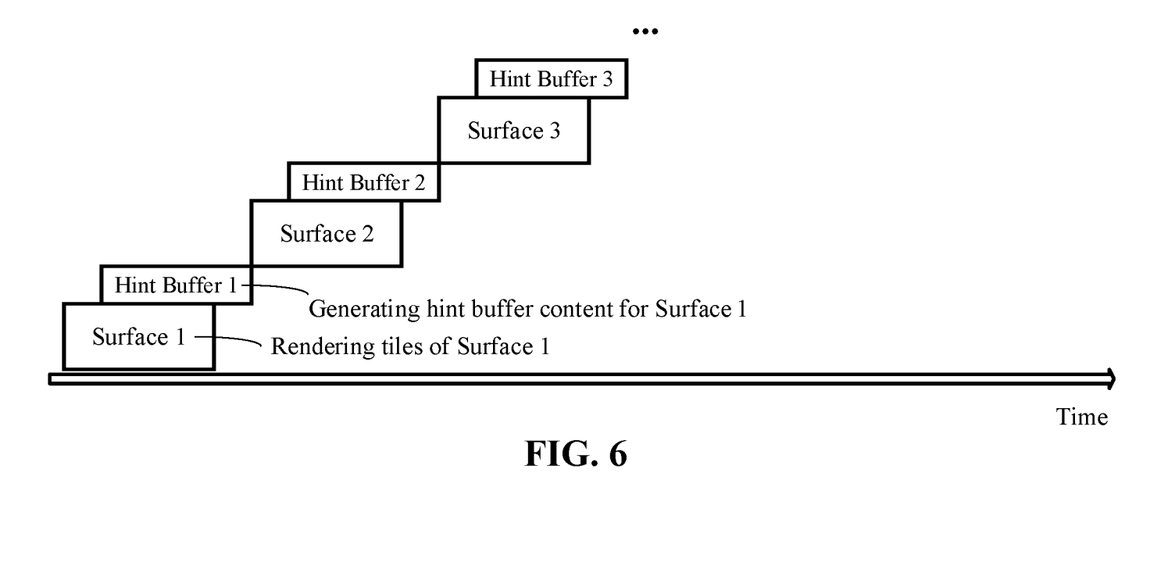
FIG. 6 illustrates a timeline of hint buffer content generation according to one embodiment.

Referring back to FIG. 1 and FIG. 3, in one embodiment, the GPU 120 generates alpha hints concurrently with rendering operations. For example, after the GPU 120 renders a first tile of a surface into pixels, the GPU 120 may generate the hint buffer 133 content of the first tile concurrently with rendering the second tile of the surface. FIG. 6 illustrates a timeline for the hint buffer 133 content generation according to one embodiment. The timeline shows that the generation of the hint buffer 133 content for a surface may be performed concurrently with surface rendering: that is, the generation of an alpha hint for a tile can start as soon as the alpha values of the tile are available in the tile buffer 330, before the entire surface is rendered. There is no need for the GPU 120 to wait for the entire surface to be rendered and written into the memory 130 to start determining the alpha hints.

Figure 7:
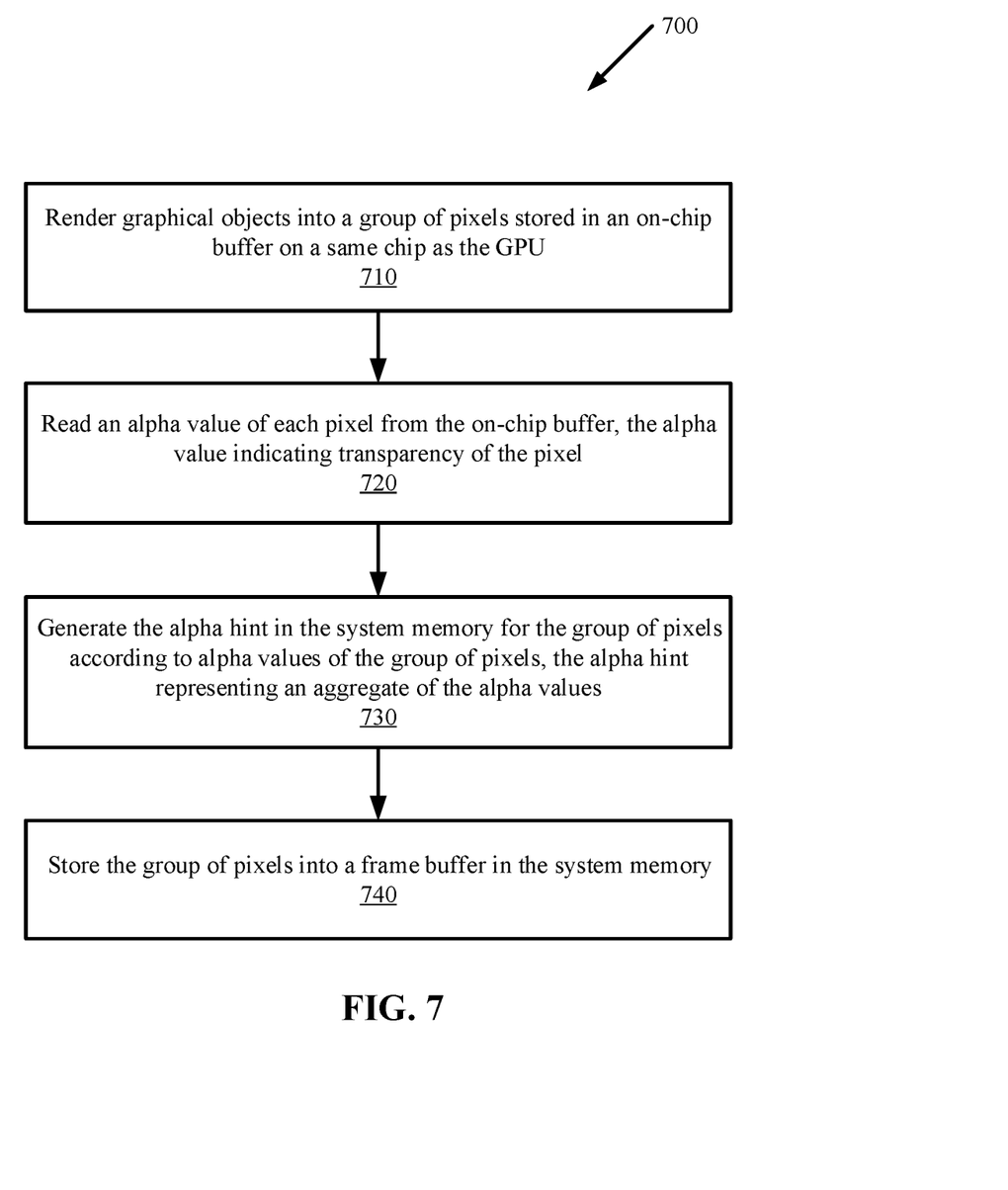
FIG. 7 is a flow diagram illustrating a method of a GPU according to one embodiment.

FIG. 7 is a flow diagram illustrating a method 700 according to one embodiment. The method 700 may be performed by hardware (e.g., circuitry, dedicated logic, programmable logic, microcode, etc.), software (e.g., instructions run on a processing device), or a combination thereof. In one embodiment, the method 700 is performed by the GPU 120 of FIGS. 1 and 3.

Referring to FIG. 7, in one embodiment, the method 700 begins when the GPU 120 renders graphical objects into a group of pixels stored in an on-chip buffer (e.g., the tile buffer 330 of FIG. 3), which is on the same chip as the GPU 120 (step 710). The GPU 120 reads an alpha value of each pixel from the on-chip buffer (step 720). The alpha value indicates transparency of the pixel; e.g., whether a pixel is fully-transparent, fully-opaque or neither. According to alpha values of the group of pixels, the GPU 120 generate an alpha hint in the system memory (e.g., the memory 130 of FIGS. 1 and 3) for the group of pixels, wherein the alpha hint represents an aggregate of the alpha values of the group of pixels (step 730). The GPU 120 then stores the group of pixels into a frame buffer (e.g., the frame buffer 131 of FIGS. 1 and 3) in the system memory (step 740).

The operations of the flow diagrams of FIGS. 4 and 7 have been described with reference to the exemplary embodiments of FIGS. 1 and 3. However, it should be understood that the operations of the flow diagrams of FIGS. 4 and 7 can be performed by embodiments of the invention other than those discussed with reference to FIGS. 1 and 3, and the embodiments discussed with reference to FIGS. 1 and 3 can perform operations different than those discussed with reference to the flow diagrams of FIGS. 4 and 7. While the flow diagrams of FIGS. 4 and 7 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for generating an alpha hint in a system memory to reduce memory access, the method comprising:
   rendering, by a graphical processing unit (GPU), graphical objects into a group of pixels stored in an on-chip buffer on a same chip as the GPU;
   reading an alpha value of each pixel from the on-chip buffer, the alpha value indicating transparency of the pixel;
   generating the alpha hint in the system memory for the group of pixels according to alpha values of the group of pixels, the alpha hint representing an aggregate of the alpha values; and
   storing the group of pixels into a frame buffer in the system memory,
   wherein generating the alpha hint further comprises concurrently setting different bits of the alpha hint according to the alpha values of two or more pixels in the group.

2. The method of claim 1, further comprising:
   executing, by a fragment shader, shader codes to read the alpha value and to generate the alpha hint.

3. The method of claim 2, further comprising:
   executing a list of commands including a number of draw calls and the draw hint command.

4. The method of claim 1, wherein the alpha hint is a binary value that indicates at least whether the group of pixels are all fully-transparent and whether the group of pixels are all fully-opaque.

5. The method of claim 1, wherein generating the alpha hint further comprises:
   setting a first bit of the alpha hint when a pixel in the group is fully-transparent; and
   keeping the first bit set for the group of pixels.

6. The method of claim 1, wherein generating the alpha hint further comprises:
   setting a second bit of the alpha hint when a pixel in the group is fully-opaque; and
   keeping the second bit set for the group of pixels.

7. The method of claim 1, wherein generating the alpha hint further comprises:
   performing atomic OR operations to serialize write access to the alpha hint.

8. The method of claim 1, wherein generating the alpha hint further comprises:
   performing, for each pixel in the group, an atomic OR operation on a current value of the alpha hint and a binary mask determined from the alpha value of the pixel.

9. The method of claim 1, further comprising:
   rendering a next group of pixels concurrently with generating the alpha hint in the system memory.

10. A graphics device for generating an alpha hint in a system memory to reduce memory access, the graphics device comprising:
- an on-chip buffer; and
- rendering hardware to render graphical objects into a group of pixels and store the group of pixels in the on-chip buffer,
- wherein the rendering hardware is further operative to:
  - read an alpha value of each pixel from the on-chip buffer, the alpha value indicating transparency of the pixel,
  - generate the alpha hint in the system memory for the group of pixels according to alpha values of the group of pixels, the alpha hint representing an aggregate of the alpha values,
  - concurrently set different bits of the alpha hint according to the alpha values of two or more pixels in the group, and
  - store the group of pixels into a frame buffer in the system memory.

11. The graphics device of claim 10, wherein the rendering hardware includes a fragment shader operative to execute shader codes to read the alpha value and to generate the alpha hint.

12. The graphics device of claim 11, wherein the rendering hardware is further operative to execute a list of commands including a number of draw calls and the draw hint command.

13. The graphics device of claim 10, wherein the alpha hint is a binary value that indicates at least whether the group of pixels are all fully-transparent and whether the group of pixels are all fully-opaque.

14. The graphics device of claim 10, wherein the rendering hardware is further operative to set a first bit of the alpha hint when a pixel in the group is fully-transparent, and to keep the first bit set for the group of pixels.

15. The graphics device of claim 10, wherein the rendering hardware is further operative to set a second bit of the alpha hint when a pixel in the group is fully-opaque, and to keep the second bit set for the group of pixels.

16. The graphics device of claim 10, wherein the rendering hardware is further operative to perform atomic OR operations to serialize write access to the alpha hint.

17. The graphics device of claim 10, wherein the rendering hardware is further operative to perform, for each pixel in the group, an atomic OR operation on a current value of the alpha hint and a binary mask determined from the alpha value of the pixel.

18. The graphics device of claim 10, wherein the rendering hardware is further operative to render a next group of pixels concurrently with generation of the alpha hint in the system memory.

* * * * *